Patented June 11, 1940

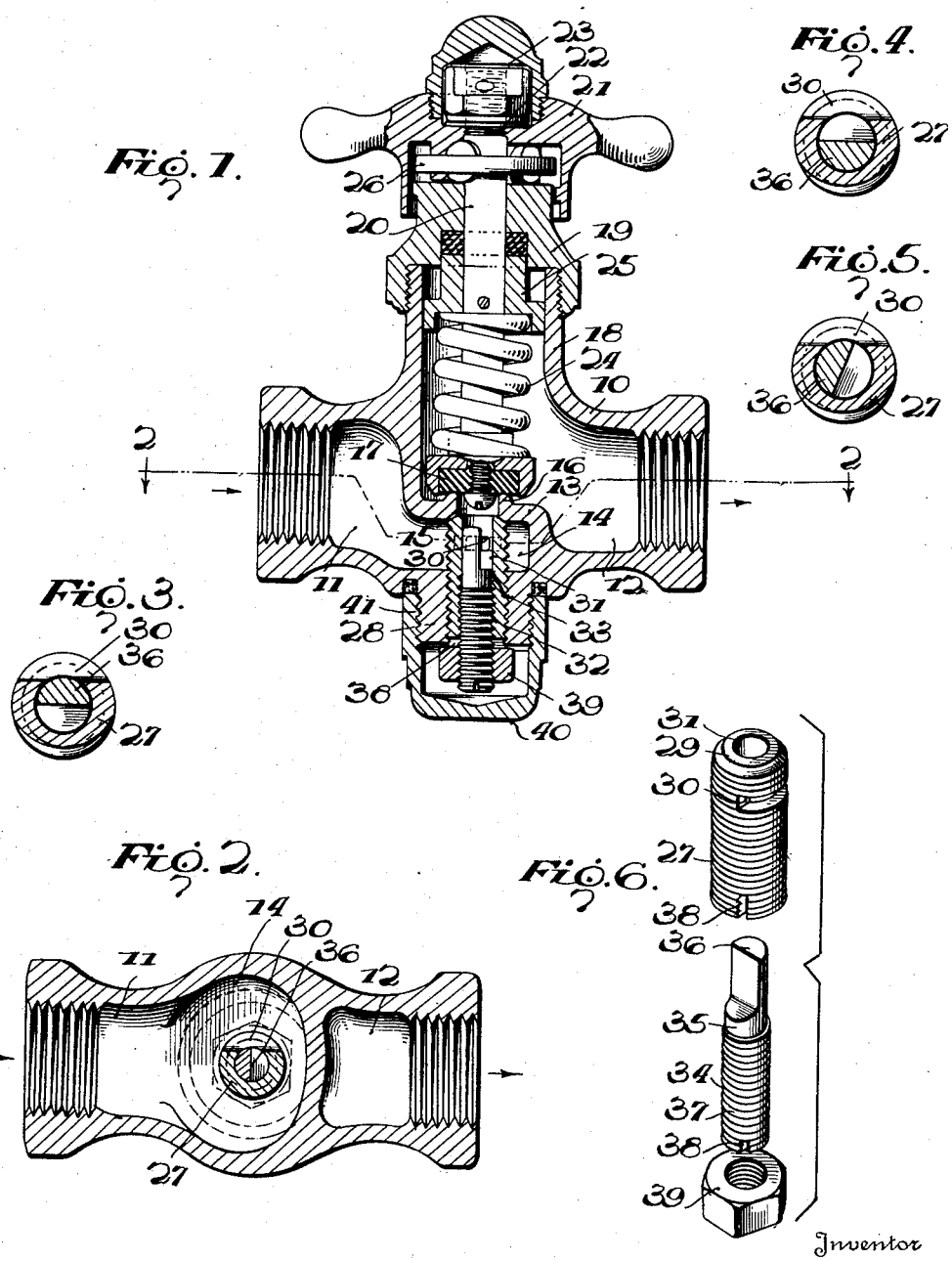

2,204,106

UNITED STATES PATENT OFFICE 2,204,106

FLOW CONTROL UNIT

Emmett M. Reedy, Los Angeles, Calif., assignor to Mueller Co., Decatur, Ill., a corporation of Illinois Application March 20, 1939, Serial No. 262,983

2 Claims. (Cl. 277—64)

The present invention relates to a control unit for regulating the flow of liquid through a valve body and more particularly to improved means for insuring a proper and uniform flow of the liquid to a drinking fountain or the like.

In certain localities, water used for drinking and other purposes not infrequently contains sand and particles of foreign matter, which in passing through the restricted supply passage, have a tendency to clog or impede the flow of the liquid, thus requiring frequent cleaning and adjusting of the valve parts.

An essential feature of the present invention consists in associating with a valve body, a flow control unit so constructed and arranged as substantially to reduce the clogging up of the supply opening caused by the collection of foreign matter therein.

A further object consists in providing a flow control unit having a relatively small or reduced opening through which the supply passes, and associating with the opening, adjustable means for regulating the volume of the liquid passing therethrough, so as to insure a uniform and proper flow of the supply to the point of use.

A further object comprehends the provision of a flow control unit for valves, said unit including a tubular member having a restricted or relatively very small opening in the side thereof through which the liquid discharges to the outlet passage. The flow of the supply through the restricted opening is controlled by an adjustable plug extending axially into the tubular member, and having a cut-out portion constituting a segmental surface movable in and out of registration with the reduced opening to control the size of the latter in accordance with the pressure supply passing through the valve body. In other words, the restricted opening in the tubular member is so formed that the segmental portion of the adjusting screw will coact therewith to secure the maximum possible opening for the size stream desired and will eliminate the necessity of spreading the opening over a relatively large area as has heretofore been required.

Other objects and advantages of the invention will become apparent from the following description when taken in conjunction with the accompanying claims and drawing.

Referring to the drawing in which is shown a preferred embodiment of the invention:

Figure 1 is a vertical sectional view of a valve body having my flow control unit associated therewith.

Figure 2 is a sectional view taken substantially along the line 2—2 of Figure 1.

Figures 3, 4 and 5 are detail sectional views showing different positions of the means for regulating the flow of the supply.

Figure 6 is a disassembled or exploded view of the parts of the flow control unit.

Referring to the drawing in which like numerals indicate like parts in the several views, 10 designates a valve body or casing having the usual inlet port 11 and the outlet port 12 separated by a transverse web or partition 13. The web 13 coacts with the lower wall of the body to provide a receiving chamber 14 which communicates with the inlet port 11. A supply opening 15 in the web establishes communication of the inlet port 11 with the outlet port 12. The upper surface of the web adjacent the opening 15 has a seat 16 for receiving the main valve 17 that controls the flow through the opening 15. The valve body 10 is provided with a medially disposed threaded extension 18, to which is connected a collar 19. The stem 20 of the valve 17 extends through the collar 19 and a handle 21, and has its upper end 22 threaded to receive a retaining nut 23 for operatively connecting the handle thereto. A coil spring 24 encircles the stem 20 and is confined between the valve seat and a packing nut or washer 25. As shown, the valve 17 is of the self-closing type and is provided with a roller bearing construction 26 for normally maintaining the valve against its seat 16.

In order to insure a uniform and proper flow of the supply through the valve body in accordance with the pressure of the liquid, a flow or volume control unit is associated with the inlet port 11. This unit preferably includes an externally threaded tubular member or bushing 27 which is connected to a threaded boss 28 extending from the bottom of the valve body. The upper end of the tubular 27 may be tapered as at 29, so as to be moved in fixed engagement with a complementary formed surface on the bottom of the web 13. The side of the tubular member 27 positioned within the chamber 14 has a relatively small or restricted circumferentially disposed opening or hole 30 which on a normal range of initial pressures, constitutes the sole means for establishing communication of the inlet port 11 with the opening 15 and the outlet port 12, when the main valve 17 is moved away from its seat. The inner wall or bore of the tubular member 27 has a smooth cylindrical portion 31 and an enlarged internally threaded portion 32 connected by a stop shoulder 33. An adjustable plug or screw 34 extends axially into the tubular member and is formed with a smooth cylindrical upper surface 35 terminating in a cut-away or segmental portion 36 (Fig. 6) of substantially semi-cylindrical shape in cross section. The reduced or segmental portion 36 is arranged to be positioned adjacent the circumferential opening 30 and is movable relative to the tubular member 27 to regulate the size of the opening 30 and may be varied in accordance with the changes in the pressures of the liquid passing through the valve body. The opposite end portion of the plug is externally threaded as at 37 and is connected to the internal threaded portion 32 for the purpose of effecting the desired axial and circumferential adjustments of the segmental portion 36, relative to the opening 30.

When the main valve 17 is used on very low pressures, the volume of the supply flowing through the restricted opening 30 may not be sufficient for the purpose intended, such as for providing an ample inclined stream or bubble to the drinking fountain. In such a case, due to the fact that the bushing 27 is axially adjustable relative to the web 13 by reason of its threaded connection with the boss 28, it may be moved away from engagement with the web 13, so as to provide an auxiliary valve or opening for increasing the flow through the main valve port 15. In other words, the bushing 27 has a double function in that it serves as an auxiliary valve when the main valve 17 is used on very low water pressures, for increasing the flow through the main valve up to the entire capacity of the main valve opening.

The lower or exposed ends of the tubular member 27 and the plug 34 may each be provided with kerf openings 38 for receiving a suitable tool to apply or remove these parts from the valve body. A locking nut 39 is arranged to be threaded to the plug 34 and bears against the end of the tubular member 27 to maintain the parts in a fixed position when the flow control unit is connected to the valve body. An internally threaded cap 40 may be detachably connected as at 41 to the boss 28, to enclose the nut 39 and the exposed ends of the bushing 27 and the screw 34.

In installing the control unit, the tubular member 27 is threaded to the boss 28, to move the tapered portion 29 thereof into tight frictional engagement with the underside of the web 13, so that the bore of the tubular member will register with the supply opening 15. The plug 34 is then inserted within the tubular member and the segmental portion 36 is rotated to regulate the size of the opening or aperture 30 in accordance with the pressure of the liquid passing through the valve body. The inward movement of the plug is arrested by the stop shoulder 33. The nut 39 is then applied to the screw 34 and forced against the end of the tubular member 27, to maintain the segmental portion 36 in its adjusted position. The cap 40 is then connected to the boss 28, to give a pleasing and attractive appearance to the device.

Heretofore, the supply opening 15 in the valve body has had associated therewith, a self-adjusting solid plug arranged to be moved away from the opening and set to provide an auxiliary opening for controlling the flow of the supply at the proper pressure, through the opening 15, when the main valve is moved away from its seat. This plug while somewhat similar in construction to the tubular member 27 is not in constant contact with the wall of the opening 15, but is adjustable relative thereto and is maintained in a set position, so that when the main valve is moved fully away from its seat, the water supply to the bubbler head of the drinking fountain through the valve body will be at the proper height for drinking purposes.

In localities where the water contains impurities such as small particles of sand, lint and the like, that would pass through an ordinary strainer, it has been found that the auxiliary opening or clearance between the control plug and the valve seat has a tendency to allow particles of sand and other foreign matter to clog up the same, thus necessitating frequent cleaning and adjusting of the control unit in order to obtain a uniform flow of the supply.

By providing the restricted opening 30 in the tubular member 27, there is secured the maximum size opening possible through the flow control unit for the proper size stream to be supplied to a bubbler head or the like. Further, the opening 30 allows small particles of sand or other impurities in the water, to wash through it and out of the fountain, thus making it difficult for foreign particles to clog up the opening because of the velocity of the water passing therethrough. The opening 30 also renders it difficult for corrosion or liming up to take place so that when once the unit is installed, it will insure a uniform and proper flow of the stream for an indefinite period of time and will not require constant inspection and cleaning due to clogging up of the same.

In operation, assuming that the pressure of the liquid supply ranges from 15 pounds to 75 pounds and it is desired to insure a uniform flow of the liquid to a drinking fountain, if the lower pressure is to be used, the plug 34 is axially and circumferentially adjusted to turn the segmental portion to its maximum width as shown in Figure 4. The locking nut 39 is then applied to the plug 34 and abuts the member 27 to maintain the plug in its set position. When the valve 16 is raised from its seat, the flow of the supply through the opening 30 will be at the proper pressure to insure a uniform flow of the liquid through the valve body to the bubbler head and will not be detrimentally affected by constant use of the valve. In other words, it will not be necessary to make frequent inspections of the valve body to clean the opening 30 or adjust the parts to obtain a proper flow of the supply. If the pressure of the supply is 75 pounds, the opening 30 is reduced almost to the size of a $\tfrac{1}{16}''$ (Fig. 5) square hole by the adjustment of the segmental portion 36 relative to the opening 30, and the parts will be maintained in a fixed position when the nut 39 on the plug is moved against the member 27. If for any reason, it becomes necessary or desirable to completely cut-off the flow of the supply through the opening 15, this may be readily effected by turning the segmental portion 36 to the position shown in Figure 3, which completely closes the opening 30. Thus, it will be seen that the size of the opening 30 may be controlled or adjusted to cover wide ranges of pressures, so as to maintain a uniform and proper flow of the supply through the valve body.

While the control unit has been shown associated with a self-closing valve, it will be manifest that it is equally applicable for use with various types of valves and fittings, and may readily be installed at a minimum expense of time and labor.

It is to be understood that the form of the invention shown and described is merely illustrative of the preferred embodiment, and that such changes may be made as fall within the purview of one skilled in the art without departing from the spirit of the invention and the scope of the appended claims.

I claim:

1. In combination with a valve body having an inlet port and an outlet port, a web separating said ports and having an opening provided with a valve seat, a main valve associated with said seat for controlling the flow of the supply to the outlet port, a control unit associated with the inlet port for limiting the flow of the supply therethrough, said unit including a tubular member connected to the valve body and adapted to engage the underside of the web, said tubular member having a restricted opening in one side thereof through which the supply to the outlet port passes, an adjustable plug extending axially into said tubular member and provided with a reduced portion, said reduced portion being movable relative to the restricted opening to regulate the size of the latter in accordance with the pressure of the liquid passing through the valve body, means for axially adjusting the tubular member relative to the web so that the tubular member may be moved away from the web to provide an auxiliary valve for increasing the flow to the outlet port when the flow through the restricted opening is insufficient for the purpose intended, and means connected to the plug to maintain the reduced portion in a fixed position relative to the restricted opening.

2. In combination with a valve body having an inlet port and an outward port, a web separating said ports and having an opening provided with a valve seat, a main valve associated with said seat for controlling the flow of the supply to the outlet port, said valve body having a tubular internally threaded boss below and in substantially vertical alignment with said valve seat, a control unit associated with the inlet port, said unit including a tubular externally threaded member connected to said boss and normally engaging the underside of the web, said tubular member having a restricted opening in one side thereof through which the supply to the outlet port passes, said tubular member below said restricted opening being internally threaded, an externally threaded plug extending axially into said tubular member and provided with a reduced portion adjacent said restricted opening, the threaded connection of said plug with the tubular member arranged to effect independent axial and rotatable adjustment of the reduced portion relative to the restricted opening to regulate the size of the latter in accordance with the pressure of the liquid passing through the valve body, said tubular member being axially adjustable relative to the web so that it may be moved away from the web to provide an auxiliary valve for increasing the flow to the outlet port when the flow through the restricted opening is insufficient for the purpose intended, and locking means threaded to the outer end of the plug for maintaining the tubular member and the plug in predetermined adjusted positions.

EMMETT M. REEDY.